US012801915B2

(12) United States Patent
Noorizadeh et al.

(10) Patent No.: US 12,801,915 B2
(45) Date of Patent: Nov. 17, 2026

(54) HYBRID EXPLAINABLE ARTIFICIAL INTELLIGENCE SYSTEM

(71) Applicant: Bank of America Corporation, Charlotte, NC (US)

(72) Inventors: Emad Noorizadeh, Plano, TX (US); Donatus Asumu, McKinney, TX (US)

(73) Assignee: Bank of America Corporation, Charlotte, NC (US)

( * ) Notice: Subject to any disclaimer, the term of this patent is extended or adjusted under 35 U.S.C. 154(b) by 565 days.

(21) Appl. No.: 18/244,971

(22) Filed: Sep. 12, 2023

(65) Prior Publication Data

US 2025/0086447 A1 Mar. 13, 2025

(51) Int. Cl.
*G06N 3/045* (2023.01)
*G06N 3/08* (2023.01)
*G06N 5/022* (2023.01)
*G06N 5/045* (2023.01)

(52) U.S. Cl.
CPC ............... *G06N 3/08* (2013.01); *G06N 5/022* (2013.01)

(58) Field of Classification Search
None
See application file for complete search history.

(56) References Cited

U.S. PATENT DOCUMENTS

| | | | | |
|---|---|---|---|---|
| 10,943,456 | B1 * | 3/2021 | Carbonell | H04W 4/90 |
| 12,079,719 | B1 * | 9/2024 | Wei | G06N 3/047 |
| 2008/0046562 | A1 * | 2/2008 | Butler | G06F 16/958 709/224 |
| 2017/0323239 | A1 * | 11/2017 | Johnson | G06Q 10/06313 |
| 2019/0379589 | A1 * | 12/2019 | Ryan | G06N 3/084 |
| 2020/0104704 | A1 * | 4/2020 | Venkataramani | G06N 3/04 |
| 2021/0142169 | A1 * | 5/2021 | De | G06N 3/08 |
| 2021/0406693 | A1 * | 12/2021 | Van Vredendaal | G06N 3/045 |
| 2023/0130567 | A1 * | 4/2023 | Cohen | G06Q 10/103 705/2 |
| 2024/0354789 | A1 * | 10/2024 | Garvey | G06N 20/00 |

OTHER PUBLICATIONS

S De Cnudde, Y Ramon, D Martens, F Provost (Deep learning on big, sparse, behavioral data)—Big data, 2019—journals.sagepub.com (Year: 2019).*

V Swamy, B Radmehr, N Krco, M Marras (Evaluating the explainers: black-box explainable machine learning for student success prediction in MOOCs) . . . - arXiv preprint arXiv . . . , 2022—arxiv.org. (Year: 2022).*

* cited by examiner

*Primary Examiner* — Hafiz A Kassim
(74) *Attorney, Agent, or Firm* — Weiss & Arons LLP

(57) ABSTRACT

A hybrid explainable artificial intelligence system may include a shallow learning model and a deep learning model. The shallow learning model may be a machine learning system. The deep learning model may be a neural network. The system may input a data set into both the shallow learning model and the deep learning model. Both the shallow learning model and the deep learning model may produce an output. When there is a common output between the shallow learning model and the deep learning model, the process performed by the shallow learning model may be used to formulate an explanation of the process performed by the deep learning model. The explanation of the process performed by the deep learning model may be used to raise the sensitivity of one or more components of the data set. Such components may include a word or phrase within a transcript.

21 Claims, 9 Drawing Sheets

HYBRID EXPLAINABLE ARTIFICIAL INTELLIGENCE SYSTEM

FIELD OF TECHNOLOGY

Aspects of the disclosure relate to artificial intelligence. Specifically, aspects of the disclosure relate to explainable artificial intelligence.

BACKGROUND OF THE DISCLOSURE

Recently, artificial intelligence has become prevalent in computer technology. Various applications of artificial intelligence may include artificial communication, interactive voice response systems, natural language processing, speech and handwriting recognition and machine vision.

In order to simulate human intelligence within a computer, an initial step may include identification, categorization and understanding of various aspects of human intelligence. Such aspects may include learning, reasoning, problem solving, perception, use of language and self-correction.

Upon identification and understanding of human intelligence, a second step may include building an artificial intelligence model. An artificial intelligence model may be a tool or algorithm which enables the model to arrive at a prediction based upon inputted data. Artificial intelligence models may include single-layer predictors and multi-layer predictors. Single-layer predictors may include machine learning models, while multi-layer predictors may include deep neural networks.

A deep neural network is an artificial intelligence model that includes multiple layers between an input set and an output set. The layers sandwiched between the input set and the output set may be hidden layers. Each of the hidden layers may include artificial neurons that are interconnected. Deep neural networks typically learn from labeled training data in order to predict an output based on inputs in a computing environment.

Many times, a developer creates an artificial intelligence model, tunes the model for a particular environment and uses the model to predict outcomes. However, an underlying system is rarely able to generate an explanation for the process used by the model to determine the outcome. In order words, it is difficult to explain the inner workings of a model with respect to the underlying cause that a specific set of inputs produced a particular outcome.

Resources may be wasted when a system is incapable of explaining what caused the inputs to generate, or otherwise obtain, a specific outcome. At times, human intervention may be required to simulate and/or recreate each step performed by a neural network in order to correctly explain a process used by the neural network.

In order to minimize the relatively large resource consumption required to recreate such as process, there has been a trend in the field of artificial intelligence called explainable artificial intelligence. Explainable artificial intelligence may use machine processes to attribute the outcome of a process to important inputs.

It would be desirable to create a new category of explainable artificial intelligence. It would be further desirable for the new category of explainable artificial intelligence to harness the capabilities of single-layer predictors, such as relatively simple machine learning models, to explain the inner workings of multi-layer predictors, such as deep neural networks.

It would be yet further desirable to use the improved explainability set forth above to improve the performance of multi-layer predictors.

SUMMARY OF THE DISCLOSURE

Apparatus, methods and systems for providing hybrid explainable artificial intelligence system are provided. The system may include a shallow learning model and a deep learning model. The shallow learning model may be a machine learning system that is based on maximum entropy. The deep learning model may be a neural network.

The system may input a data set into both the shallow learning model and the deep learning model. Both the shallow learning model and the deep learning model may produce an output. When there is a common output between the shallow learning model and the deep learning model, the process performed by the shallow learning model may be used to formulate an explanation of the process performed by the deep learning model.

One use case of such a system may be an interactive conversational assistant. The interactive conversational assistant may generate a transcript for each conversation between the interactive conversational assistant and a human. The deep learning model and/or the shallow learning model may receive the transcript as input. The output of the deep learning model and/or the shallow learning model may be a label for the transcript. The label for the transcript may be customer satisfaction, customer dissatisfaction, customer complaint inclusive or customer complaint exclusive.

When the label produced by the shallow learning model and the label produced by the deep learning model is the same, or possess greater than a threshold of similarity, the system may leverage a process explanation of the shallow learning model to determine a process explanation of the deep learning model.

It should be noted that the deep learning model may consider the entirety of a conversation, while the shallow learning model may retrieve key words to label a conversation. As such, the shallow learning model may be able to train the deep learning model to identify specific key words or phrases as determiners for a conversation and a consequent prediction.

Additionally, the shallow learning model may be able to provide visual representation of the machine learning process. Such a visual representation may be useful for developers and other stakeholders to understand the machine learning process.

Furthermore, inputting the explanation provided by the shallow learning model into the deep learning model may generate a more reactive deep learning model. As such, the deep learning model may be re-weighted in such a way to explain the relevance of the label (also referred to as classification).

The tuning of the deep learning model can be used to sensitively identify a cause of classification made to a conversation. As such, if the conversation is modified at an appropriate interval, a more positive outcome can be generated. The modification can be translated into an extra signal within the interactive conversation assistant and/or human training.

The system may harness the capabilities of single-layer predictors, such as relatively simple machine learning models, to explain the inner workings of multi-layer predictors, such as deep neural networks. The improved explainability may be used to improve the performance of multi-layer predictors.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
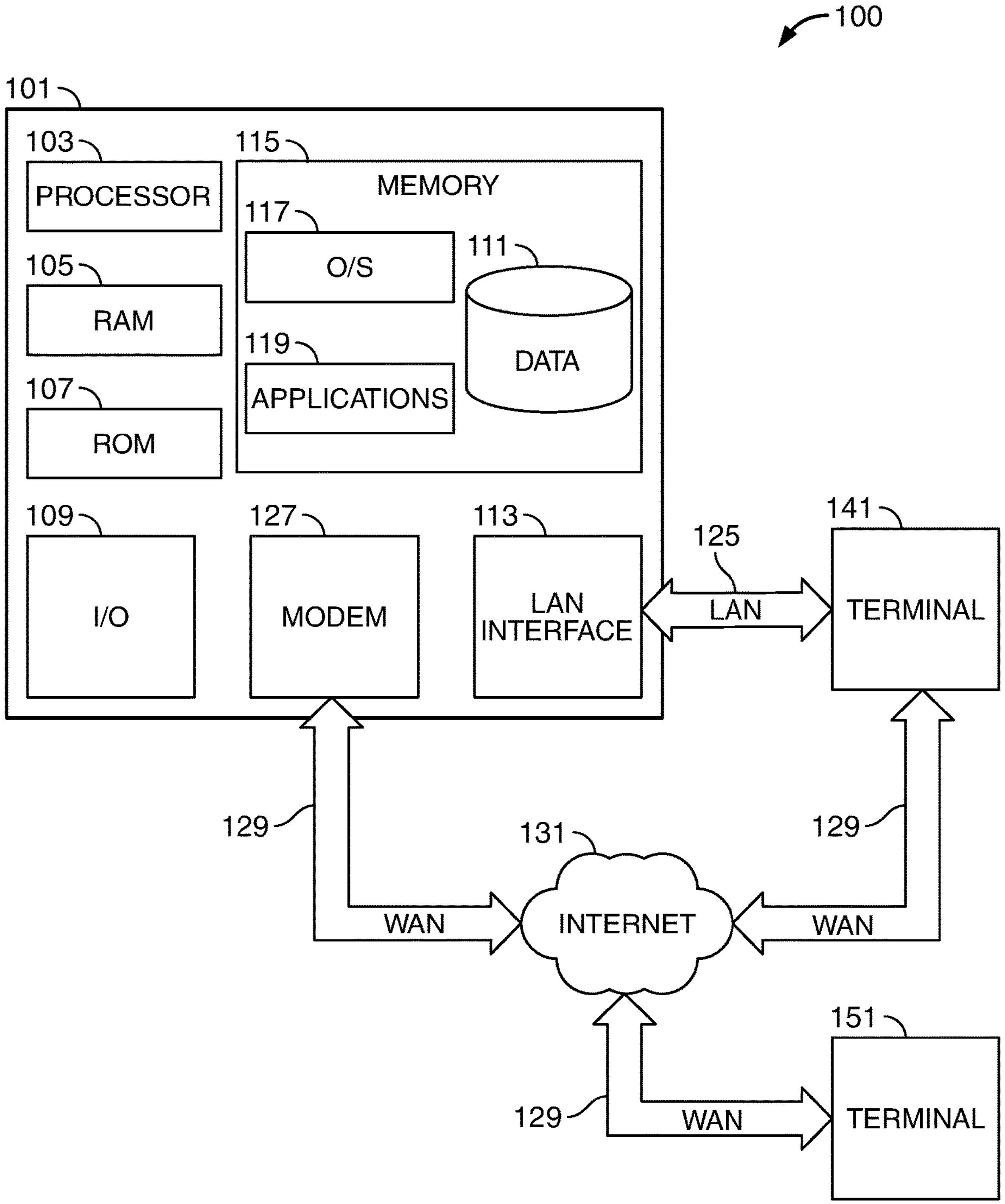
FIG. 1 shows an illustrative diagram in accordance with principles of the disclosure.

Apparatus, methods and systems for generating explainable artificial intelligence is provided. Systems may include a shallow learning system. The shallow learning system may include a single-layer predictor, such as a machine learning model. The shallow learning system may receive a data set. The shallow learning system may process the data set into a feature set.

Systems may include a deep learning system. The deep learning system may include a multi-layer predictor, such as a neural network. The deep learning system may receive the data set. The data set may be identical to the data set received at the shallow learning system. The deep learning system may process the data set into raw data. The deep learning system may create, from the raw data, a prediction set with one or more layers.

Systems may include a processor. The processor may map the prediction set against the feature set. In some embodiments, the processor may map one or more selected layers from the prediction set against the feature set. The processor may utilize a heatmap of the feature set and a heatmap of the prediction set to map the prediction set against the feature set.

Based on the map, the processor may identify to what extent each feature, included in the feature set, contributed to a final prediction from the prediction set. Based on the map, the processor may generate an explanation of the predictive behavior of the deep learning system.

Methods may include inputting a data set into a shallow learning system. The shallow learning system may include a single-layer predictor.

Methods may also include inputting a data set into a deep learning system. The deep learning system may include a multi-layer predictor.

Methods may include processing, at the shallow learning system, the data set into a feature set.

Methods may include processing, at the deep learning system, the data set into raw data. Methods may include creating, at the deep learning system, from the raw data, a prediction set with multiple layers.

Methods may include mapping the prediction set (or one or more of the layers included in the prediction set) against the feature set to identify to what extent each feature contributed to a final prediction from the prediction set. Methods may include, based on the mapping, generating an explanation of the predictive behavior of the deep learning system.

Embodiments of a hybrid neural network for use in enhancing interactive voice response ("IVR") systems are provided. The hybrid neural network may include a shallow neural network component. The shallow neural network may include a single layer predictor. The single-layer predictor may further include a classifier or a machine-learning model.

The shallow neural network component may be used for processing data. The shallow neural network component may be used for organizing the data into a plurality of feature sets. In preferred embodiments, each of the feature sets may preferably correspond to a specific topic.

The hybrid neural network may also include a deep neural network component. The deep neural network component may include a multi-layer predictor. The multi-layer predictor may further include a deep learning model and/or a neural network.

The deep neural network component may also be used for processing the data. The deep neural network component may be used for predicting a plurality of outcomes based on the data.

In some embodiments, the network may be configured to map each of the plurality of predicted outcomes obtained from the deep neural network against the plurality of feature sets corresponding to specific topics obtained from the organization of the shallow neural network component. Based on the mapping, the network may preferably revise a training set for the deep neural network component. For the purposes of this application, the training set may be understood to include a set of examples used during the learning process. Further, the training set may be is used to fit the parameters (e.g., weights) of, for example, a classifier.

The revising may include leveraging one or more of the feature sets to refine the training set.

In some embodiments, one or more of the feature sets may include a parameter associated with a size of context selection retrieved with respect to a predetermined data input. The size of the context selection retrieved with respect to predetermined data input may, in certain embodiments, depend on instructions defined in the training set.

The shallow neural network component may, in certain embodiments, include a heatmap. The deep neural network component may also include a heatmap. The shallow neural network component may be configured to map the shallow network component heatmap on the deep neural network component heatmap to further refine the training set.

Some embodiments may include methods for enhancing interactive voice response (IVR) systems. The method may use a hybrid neural network. The method may include processing data using a shallow neural network component. The shallow neural network may comprise a single layer predictor.

The methods may further include organizing the data using the shallow neural network component into a plurality of feature sets. Each of the feature sets may correspond to a specific topic.

The methods may further include processing the data using a deep neural network component. The deep neural network component may include a multi-layer predictor.

The method may further use the deep neural network component to predict a plurality of outcomes based on the data.

The method may map each of the plurality of predicted outcomes obtained from the deep neural network against the plurality of feature sets corresponding to specific topics obtained from the organization of the shallow neural network component. Based on the mapping, the method may revise a training set for the deep neural network component. The revisions may include leveraging one or more of the feature sets to refine the training set.

One or more of the feature sets may include a parameter associated with a size of context selection retrieved with respect to a predetermined data input. The size of the context selection retrieved with respect to predetermined data input may depend on the training set.

In some embodiments, a hybrid neural network for use in enhancing interactive voice response (IVR) systems may be provided. This network may also include a shallow neural network component and a deep neural network component.

This network may be configured to map each of the plurality of predicted outcomes obtained from the deep neural network against the plurality of feature sets corresponding to specific topics obtained from the organization of the shallow neural network component. This mapping may be configured to obtain a set of delta values obtained using a comparison between plurality of feature sets and the training set. Based on the mapping, this network may revise a training set for the deep neural network component. The revising may include leveraging, based on the set of delta values, one or more of the feature sets to refine the training set.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an artificial intelligence implemented termination program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a artificial intelligence implemented termination program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented termination program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an artificial intelligence implemented termination program and security protocols, as well as other programs. In an embodiment, one or more programs, or aspects of a program, may use one or more AI/ML algorithm(s). The various tasks may be related to terminating or preventing a malicious AI from completing its malicious activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
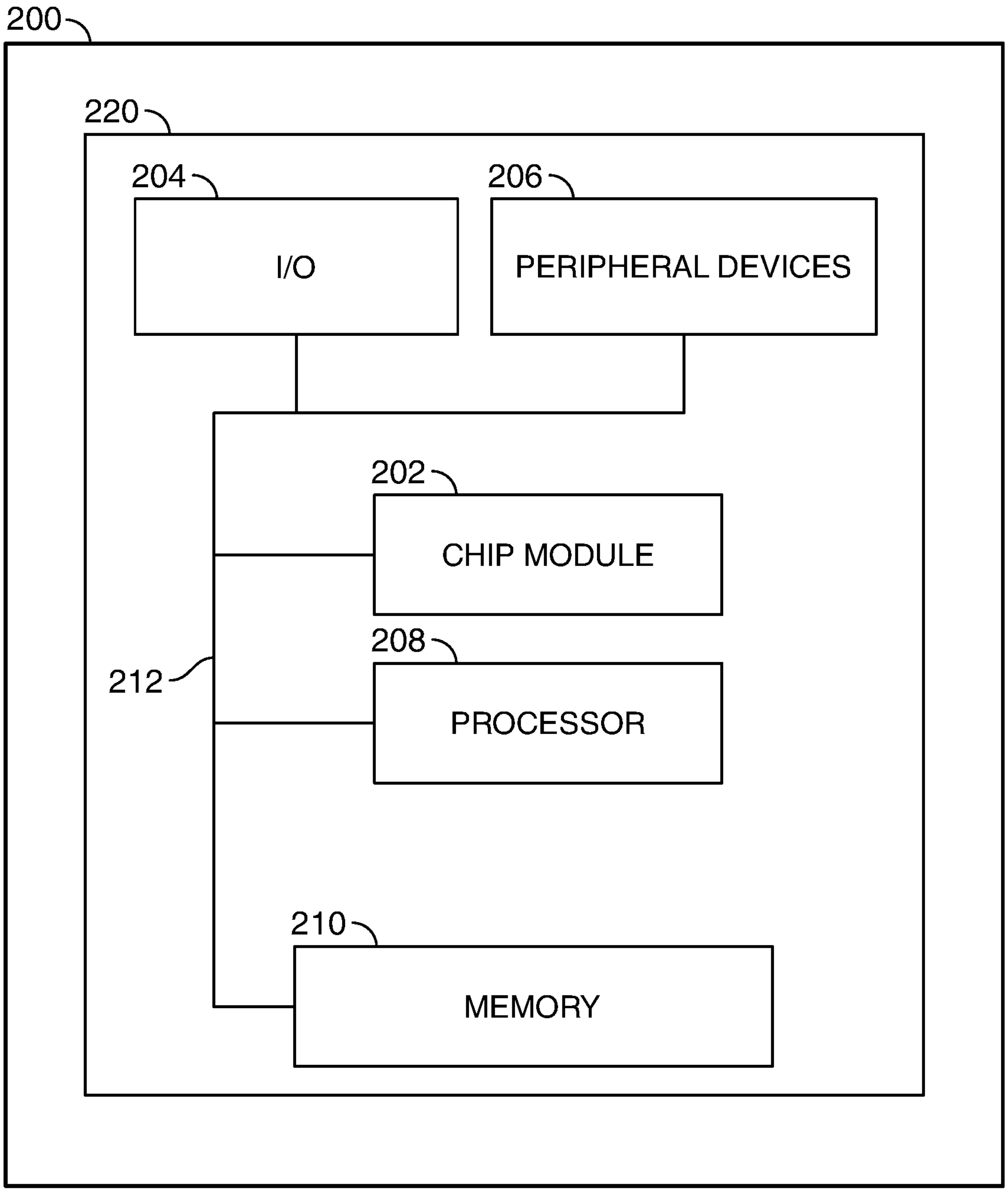
FIG. 2 shows another illustrative diagram in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-9. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
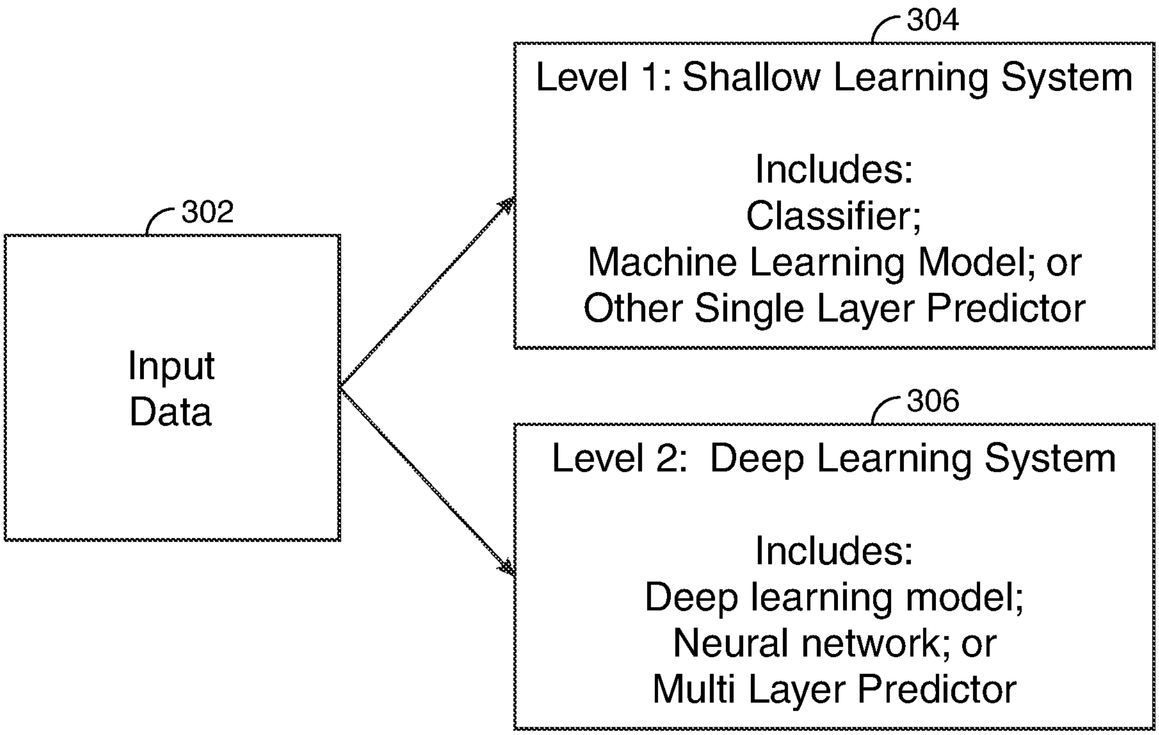
FIG. 3 shows still another illustrative diagram in accordance with principles of the disclosure.

FIG. 3 shows input data at 302. Input data 302 may be inputted into level 1 shallow learning system 304 and level 2 deep learning system 306. Shallow learning system 304 may include a classifier, machine learning model or other single-layer predictor. Deep learning system 306 may include deep learning model, neural network or multi-layer predictor.

Figure 4:
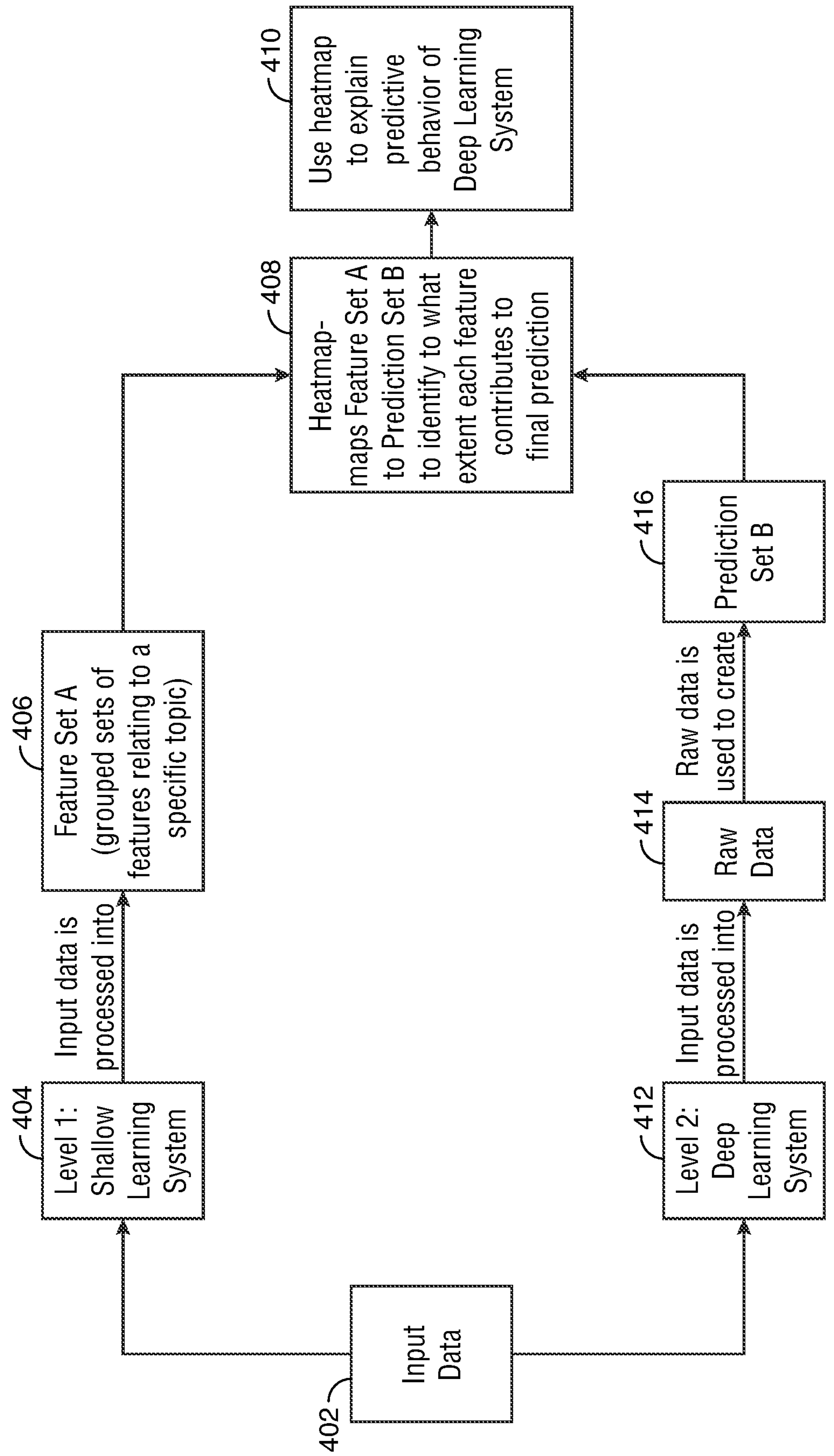
FIG. 4 shows yet another illustrative diagram in accordance with principles of the disclosure.

FIG. 4 shows input data at 402. Input data 402 may be inputted into level 1 shallow learning system 404 and level 2 deep learning system 412. Level 1 shallow learning system 404 may process input data into feature set A, shown at 406. Feature set A may be grouped sets of features relating to a specific topic.

Level 2 deep learning system 412 may process input data into raw data 414. Raw data 414 may be used to create prediction set B, shown at 416. A heatmap may be used to map feature set A to prediction set B to identify to what extent each feature contributes to a final prediction, as shown at 408. The heatmap may be used to explain the predictive behavior of the deep learning system, as shown at 410.

Figure 5:
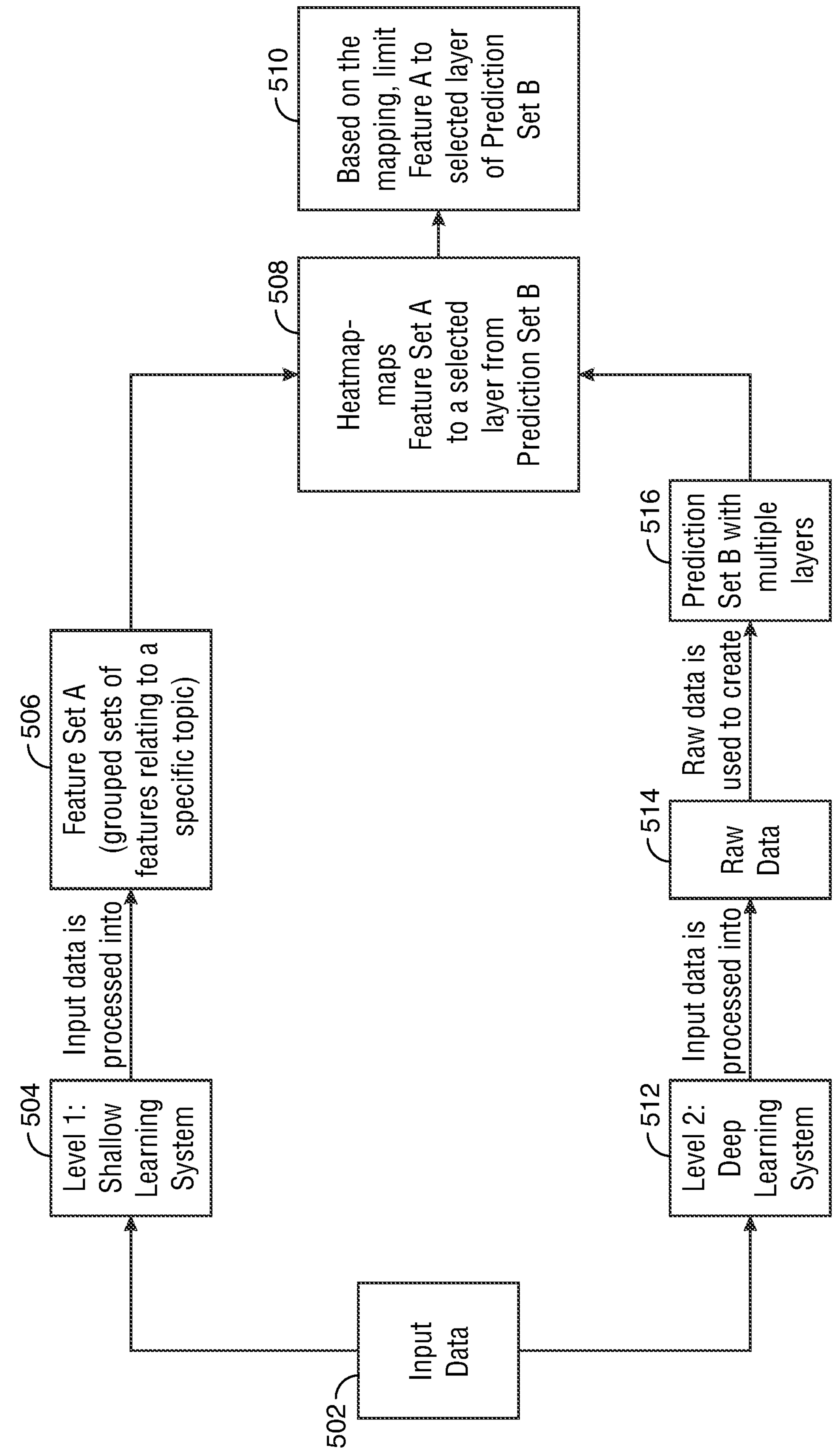
FIG. 5 shows still another illustrative diagram in accordance with principles of the disclosure.

FIG. 5 shows input data at 502. Input data 502 may be inputted into level 1 shallow learning system 504 and level 2 deep learning system 512. Level 1 shallow learning system 504 may process input data into feature set A, shown at 506. Feature set A may be grouped sets of features relating to a specific topic.

Level 2 deep learning system 512 may process input data into raw data 514. Raw data 514 may be used to create prediction set B, shown at 516. A heatmap may be used to map feature set A to a selected layer from prediction set B, as shown at 508. Based on the mapping, feature set A may be limited to the selected layer of prediction set B, as shown at 410.

Figure 6:
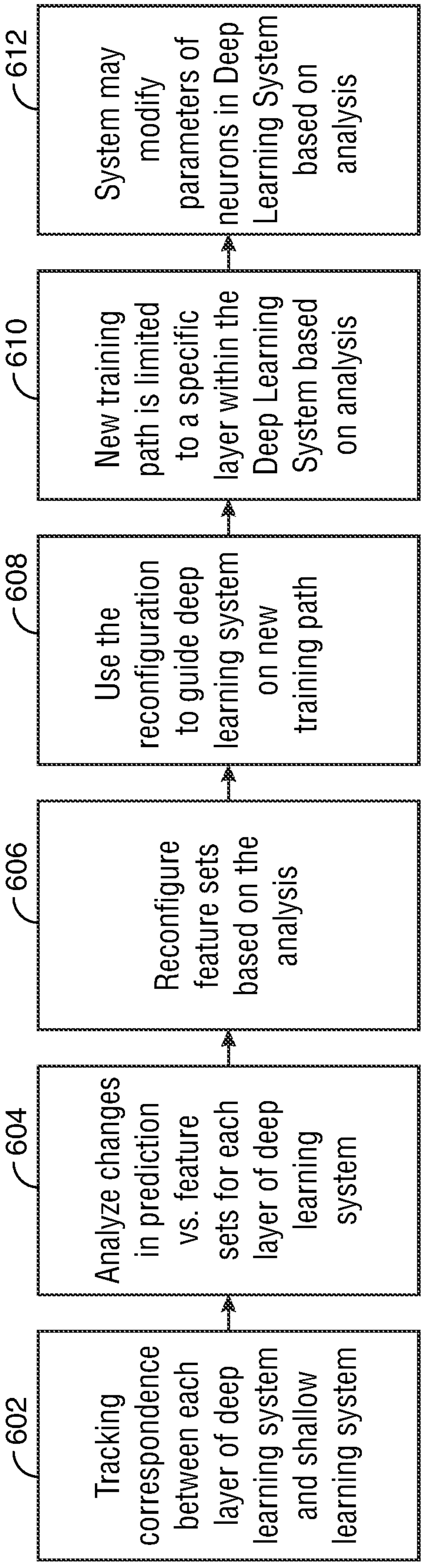
FIG. 6 shows yet another illustrative diagram in accordance with principles of the disclosure.

FIG. 6 an illustrative diagram. Step 602 shows tracking correspondence between each layer of a deep learning system and a shallow learning system. Step 604 shows analyzing changes in prediction sets as compared to feature sets for each layer of the deep learning system. Step 606 shows reconfiguring feature sets based on the analysis.

Step 608 shows using the reconfiguration to guide the deep learning system on a new training path. Step 610 shows new training paths are limited to a specific layer within the deep learning system. The limitation of the deep learning system may be based on the analysis. Step 612 shows the system may modify parameters (such as weights or sensitivities) of neurons in the deep learning system. The parameter modification may be based on the analysis of changes in the prediction set as compared to the feature set.

Figure 7:
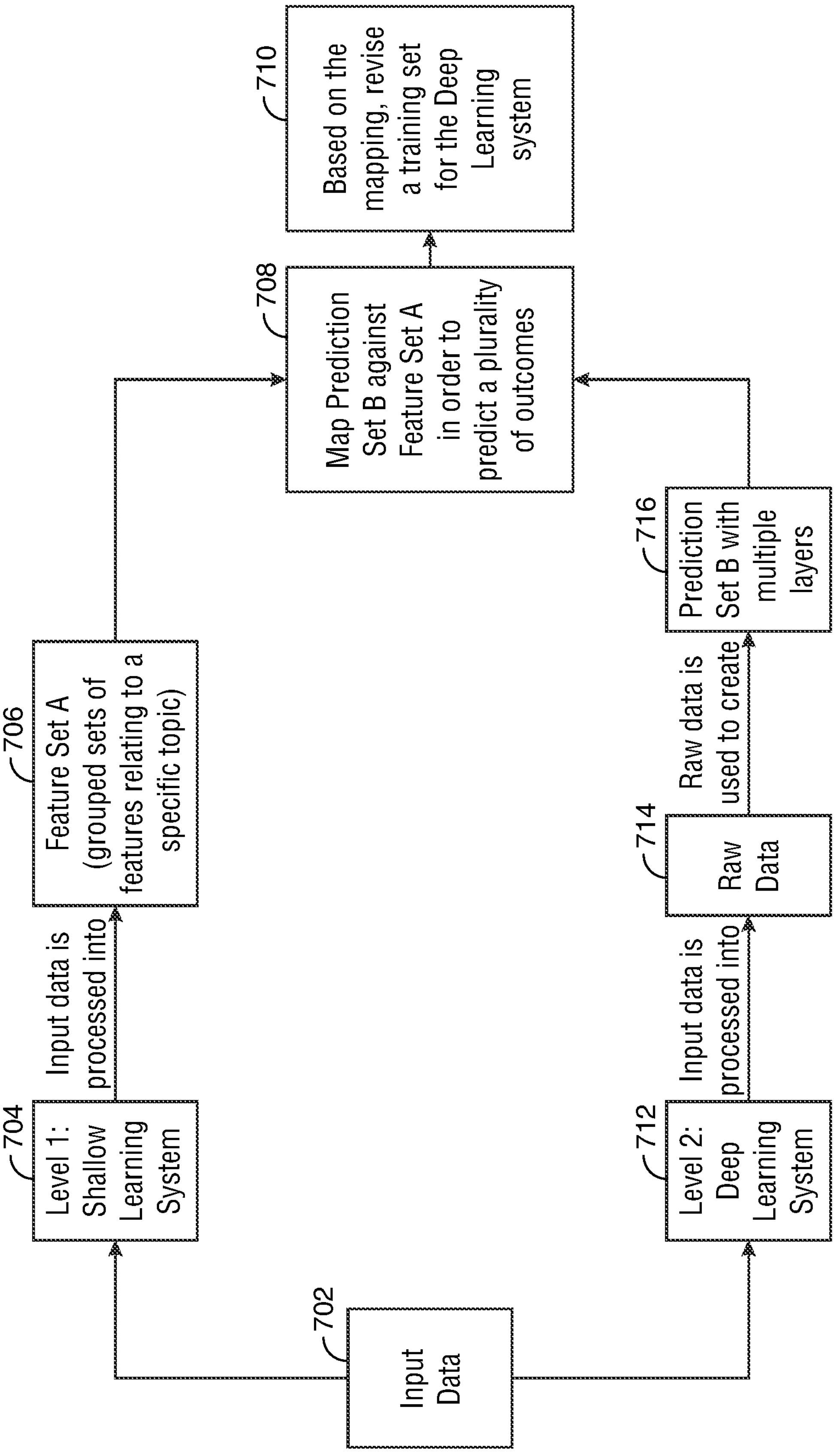
FIG. 7 shows still another illustrative diagram in accordance with principles of the disclosure.

FIG. 7 shows input data at 702. At 704, the level 1 shallow learning system is implemented. System 704 preferably processes the data to obtain feature set A, as shown at 706. Feature set A 706 reflects a grouped set of features preferably relating to a specific topic.

Substantially simultaneously to processing at steps 704 and 706, input data 702 is processed at Level 2—i.e., a deep learning system 712. Input data is processed as raw data 714 which is used to create a prediction set B with multiple layers, as shown at 716.

At 708, the system may map prediction set B against feature set A in order to predict a plurality of possible outcomes. Based on the mapping, the system may revise a training set for the deep learning system, as shown at 710.

Figure 8:
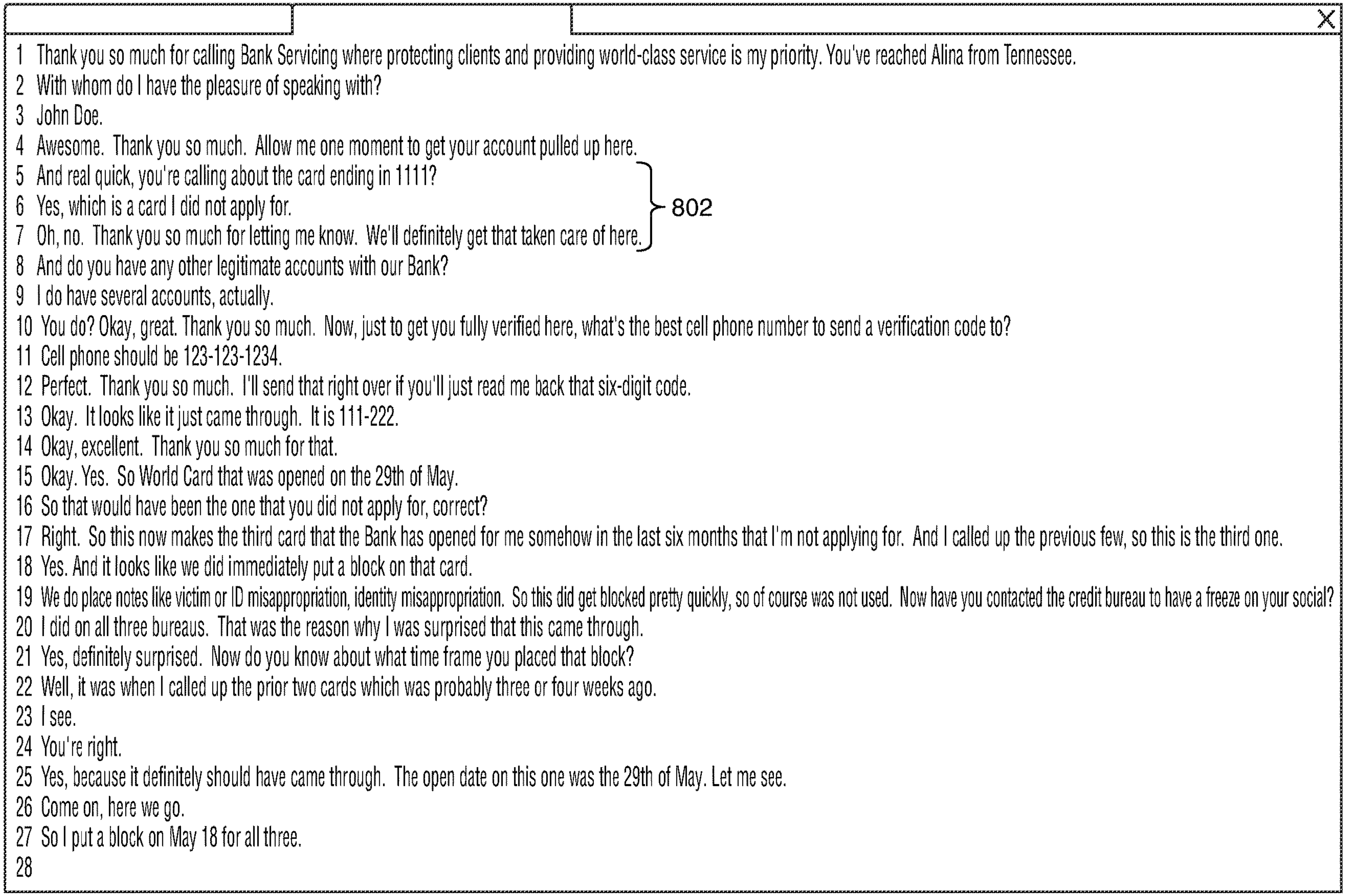
FIG. 8 shows yet another illustrative diagram in accordance with principles of the disclosure.

The revision of the training set at 710 may include the subject matter shown in FIGS. 8 and 9 and described in the written portion of the specification as follows. At FIG. 8, segment 802, a selected portion of a transcript is shown. This selected portion is a small segment taken from the larger transcript.

Such a relatively small segment 802 may correspond to a determination obtained by the shallow learning system. The shallow learning system may obtain the small segment based on the statement that the user received a card "that I did not apply for."

Figure 9:
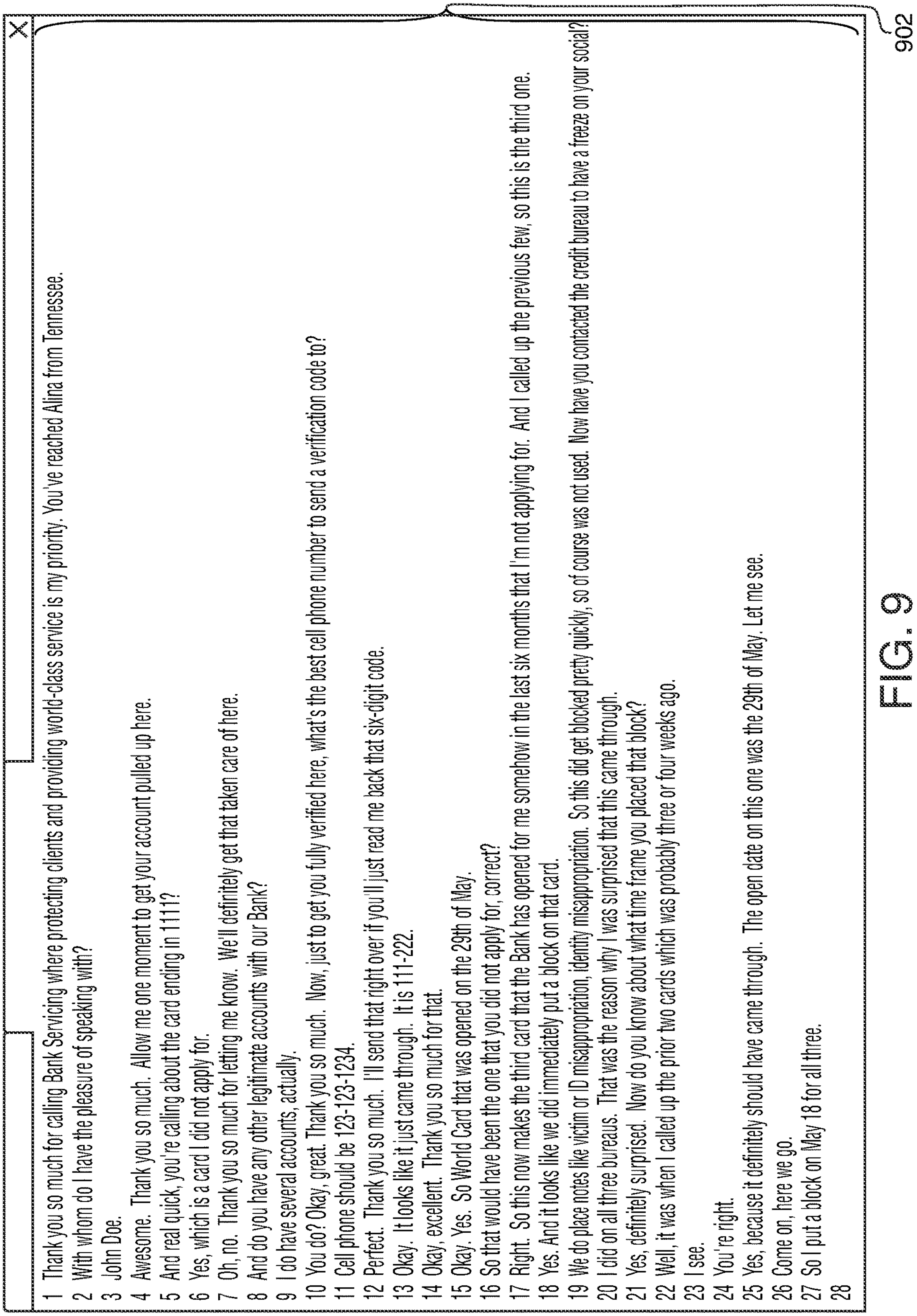
FIG. 9 shows yet still another illustrative diagram in accordance with principles of the disclosure.

In FIG. 9, another selected portion 902 of a transcript is shown. This selected portion is a relatively larger segment 902 taken from the transcript. Such a relatively larger segment 902 may correspond to a determination obtained by the deep learning system. The relatively larger segment 902 may be obtained because the parameters of the deep learning system default to a retrieving a deeper context for a selected portion of a transcript. In such an instance, the shallow learning system may arrive at a similar result as the deep learning system, albeit in a much shorter time period. The shorter time period of the shallow learning system may preferably arrive at the same result at least because the context used by the shallow learning system was much smaller than the context used by the deep learning system.

Upon comparison of results of the shallow learning system and the deep learning system, the deep learning system may then preferably have its training set updated to include the protocol used by the shallow learning system which involved, in this particular instance, a substantially reduced context.

Thus, systems and methods for hybrid explainable artificial intelligence system are provided. Persons skilled in the art will appreciate that the present invention can be practiced by other than the described embodiments, which are presented for purposes of illustration rather than of limitation. The present invention is limited only by the claims that follow.

What is claimed is:

1. A method for generating explainable artificial-intelligence, the method comprising:

inputting a data set into a shallow learning system, the shallow learning system comprising a single-layer predictor;

inputting the data set into a deep learning system, the deep learning system comprising a multi-layer predictor;

processing, at the shallow learning system, the data set into a feature set;

processing, at the deep learning system, the data set into raw data;

creating, at the deep learning system, from the raw data, a prediction set with multiple layers;

mapping the prediction set against the feature set to identify to what extent each feature contributed to a final prediction from the prediction set;

based on the mapping, generating an explanation of predictive behavior exhibited by the deep learning system;

tracking correspondence between each layer of the deep learning system and the shallow learning system;

analyzing changes in prediction sets as compared to feature sets for each layer of the deep learning system;

reconfiguring the feature sets based on the analysis for each layer of the deep learning system; and using the feature sets, as reconfigured, to guide the deep learning system on a new training path limited to a specific layer within the deep learning system, wherein the system modifies parameters of neurons in the deep learning system.

2. The method of claim 1 wherein the mapping utilizes a heatmap.

3. The method of claim 1 wherein the single-layer predictor is a machine learning model.

4. The method of claim 1 wherein the multi-layer predictor is a neural network.

5. A method for generating explainable artificial-intelligence, the method comprising:
inputting a data set into a shallow learning system, the shallow learning system comprising a single-layer predictor;
inputting the data set into a deep learning system, the deep learning system comprising a multi-layer predictor;
processing, at the shallow learning system, the data set into a feature set;
processing, at the deep learning system, the data set into raw data;
creating, at the deep learning system, from the raw data, a prediction set with multiple layers;
mapping a selected layer from the prediction set against the feature set to identify to what extent each feature contributed to a final prediction from the prediction set;
based on the mapping, generating an explanation of predictive behavior exhibited by the deep learning system;
tracking correspondence between each layer of the deep learning system and the shallow learning system;
analyzing changes in prediction sets as compared to feature sets for each layer of the deep learning system;
reconfiguring the feature sets based on the analysis for each layer of the deep learning system; and
using the feature sets, as reconfigured, to guide the deep learning system on a new training path limited to a specific layer within the deep learning system, wherein the system modifies parameters of neurons in the deep learning system.

6. The method of claim 5 wherein the mapping utilizes a heatmap.

7. The method of claim 5 wherein the single-layer predictor is a machine learning model.

8. The method of claim 5 wherein the multi-layer predictor is a neural network.

9. A system for generating explainable artificial-intelligence, the system comprising:
a shallow learning system operable to:
receive a data set; and
process the data set into a feature set;
a deep learning system operable to:
receive the data set;
process the data set into raw data; and
create, from the raw data, a prediction set with multiple layers;
a processor operable to:
map the prediction set against the feature set; and
based on the map:
identify to what extent each feature, included in the feature set, contributed to a final prediction from the prediction set; and
generate an explanation of predictive behavior exhibited by the deep learning system;
track correspondence between each layer of the deep learning system and the shallow learning system;
analyze changes in prediction sets as compared to feature sets for each layer of the deep learning system;
reconfigure the feature sets based on the analysis for each layer of the deep learning system; and
use the feature sets, as reconfigured, to guide the deep learning system on a new training path limited to a specific layer within the deep learning system, wherein the processor modifies parameters of neurons in the deep learning system.

10. The system of claim 9 wherein the processor utilizes a heatmap of the feature set and a heatmap of the prediction set to map the prediction set against the feature set.

11. The system of claim 9 wherein the shallow learning system comprises a single-layer predictor.

12. The system of claim 11 wherein the single-layer predictor is a machine learning model.

13. The system of claim 9 wherein the deep learning system comprises a multi-layer predictor.

14. The system of claim 13 wherein the multi-layer predictor is a neural network.

15. A system for generating explainable artificial-intelligence, the system comprising:
a shallow learning system operable to:
receive a data set; and
process the data set into a feature set;
a deep learning system operable to:
receive the data set;
process the data set into raw data; and
create, from the raw data, a prediction set with multiple layers;
a processor operable to:
map a selected layer from the prediction set against the feature set; and
based on the map:
identify to what extent each feature, included in the feature set, contributed to a final prediction from the prediction set; and
generate an explanation of predictive behavior exhibited by the deep learning system;
track correspondence between each layer of the deep learning system and the shallow learning system;
analyze changes in prediction sets as compared to feature sets for each layer of the deep learning system;
reconfigure the feature sets based on the analysis for each layer of the deep learning system; and
use the feature sets, as reconfigured, to guide the deep learning system on a new training path limited to a specific layer within the deep learning system, wherein the processor modifies parameters of neurons in the deep learning system.

16. The system of claim 15 wherein the processor utilizes a heatmap of the feature set and a heatmap of the prediction set to map the prediction set against the feature set.

17. The system of claim 15 wherein the shallow learning system comprises a single-layer predictor.

18. The system of claim 17 wherein the single-layer predictor is a machine learning model.

19. The system of claim 15 wherein the deep learning system comprises a multi-layer predictor.

20. The system of claim 19 wherein the multi-layer predictor is a neural network.

21. The system of claim 15 wherein the explanation is formatted in natural language.

* * * * *